(12) United States Patent
Ohmi et al.

(10) Patent No.: US 7,517,473 B2
(45) Date of Patent: Apr. 14, 2009

(54) METHOD FOR PRODUCING BLUE PHOSPHOR

(75) Inventors: Koutoku Ohmi, Tottori (JP); Makoto Higuchi, Hida (JP); Jun-ichi Itoh, Ageo (JP); Tomoyasu Yano, Ageo (JP); Asuka Sasakura, Ageo (JP)

(73) Assignees: Tottori University, Tottori (JP); Mitsui Mining & Smelting Co., Ltd., Tokyo (JP)

( * ) Notice: Subject to any disclaimer, the term of this patent is extended or adjusted under 35 U.S.C. 154(b) by 303 days.

(21) Appl. No.: 11/386,796

(22) Filed: Mar. 23, 2006

(65) Prior Publication Data

US 2006/0214135 A1 Sep. 28, 2006

(30) Foreign Application Priority Data

Mar. 25, 2005 (JP) ............................ 2005-089900

(51) Int. Cl.
*C09K 11/56* (2006.01)
*C09K 11/59* (2006.01)
*C09K 11/55* (2006.01)

(52) U.S. Cl. .......................... 252/301.4 S; 252/301.4 F

(58) Field of Classification Search ........... 252/301.4 S, 252/301.4 F
See application file for complete search history.

(56) References Cited

OTHER PUBLICATIONS

Avella, "Cathodoluminescence of Alkaline Earth Thiosilicate Phosphors", J. Electrochem. Soc.:Solid State Science, Nov. 1971, pp. 1862-1863.*

* cited by examiner

*Primary Examiner*—C. Melissa Koslow
(74) *Attorney, Agent, or Firm*—Sughrue Mion, PLLC

(57) ABSTRACT

A method for producing a blue phosphor, comprising firing a mixture for 2 to 24 hours at a temperature of 800° C. or higher in an atmosphere of hydrogen sulfide, carbon disulfide, or an inert gas, the mixture containing a barium compound component, a silicon compound component, and a cerium compound component in quantitative proportions such that the atomic ratios of the components fulfill the equations $0.50 < \text{Si}/\text{Ba} \leq 0.70$ and $0.0005 \leq \text{Ce}/\text{Ba} \leq 0.03$, or the mixture further containing a sulfur compound component in addition to these components. The blue phosphor has high color purity, high luminance, high chemical stability, and a low crystallization temperature, and is suitable for use in displays such as FED, PDP, and EL displays, or for use in the excitation of near-ultraviolet LED.

21 Claims, 4 Drawing Sheets

METHOD FOR PRODUCING BLUE PHOSPHOR

The entire disclosure of Japanese Patent Application No. 2005-089900 filed Mar. 25, 2005 is expressly incorporated by reference herein.

BACKGROUND OF THE INVENTION

1. Field of the Invention

This invention relates to a method for producing a blue phosphor. More particularly, the invention relates to a blue phosphor which has high color purity, high luminance, high chemical stability, and a low crystallization temperature, and which is suitable for use in displays such as FED (field emission displays), PDP (plasma displays), and EL (electroluminescence) displays, or for use in the excitation of near-ultraviolet LED (light emitting diodes).

2. Description of the Related Art

As blue phosphors for inorganic EL displays, (1) SrS:Ce, (2) $MGa_2S_4$:Ce (M=Sr, Ca), (3) $BaAl_2S_4$:Eu, (4) $Ba_2SiS_4$:Ce and the like have been known so far. As blue phosphors for LED lamps, (5) $(Ba,Mg)Al_{10}O_{17}$:Eu, (6) $Sr_5(PO_4)_3Cl$:Eu and the like are known.

The above (1) SrS:Ce gives a relatively high luminance, but is bluish green in tone, and has poor color purity. Moreover, lattice defects are apt to form in the material, and the tone of this material varies widely. With the (2) $MGa_2S_4$:Ce (M=Sr, Ca), color purity is satisfactory, but luminance is low. Furthermore, this material has a multi-component composition, involving troublesome control over its composition. In the case of the (3) $BaAl_2S_4$:Eu, color purity is satisfactory, and luminance is high, but its multi-component composition requires complicated control. Besides, this material is easily degradable in the atmosphere, and thus its chemical stability is very low. Moreover, its crystallization temperature is so high (750° C. or higher) that its use in inexpensive glass substrates is difficult. The (4) $Ba_2SiS_4$:Ce is satisfactory in color purity, high in chemical stability, and low in crystallization temperature, but is low in luminance. The (5) $(Ba,Mg)Al_{10}O_{17}$:Eu and (6) $Sr_5(PO_4)_3Cl$:Eu have excitation bands in the near-ultraviolet wavelength region, and they are expected to be applicable to lamps in combination with near-ultraviolet LED. However, their conversion efficiency for light is insufficient.

It is an object of the present invention to provide a method for producing a blue phosphor which has high color purity, high luminance, high chemical stability, and a low crystallization temperature, and which is suitable for use in displays such as FED (field emission displays), PDP (plasma displays), and EL (electroluminescence) displays, or for use in the excitation of near-ultraviolet LED (light emitting diodes).

SUMMARY OF THE INVENTION

The inventors conducted extensive studies in an attempt to attain the above object. Contrary to their expectation, they have found that a blue phosphor, which has very high luminance while retaining satisfactory color purity, high chemical stability, and low crystallization temperature, can be obtained by changing the conditions for manufacturing the aforementioned (4) $Ba_2SiS_4$:Ce. This finding has led them to accomplish the present invention.

A first aspect of the present invention is a method for producing a blue phosphor, comprising firing a mixture in an atmosphere of hydrogen sulfide or carbon disulfide, the mixture containing a barium compound component, a silicon compound component, and a cerium compound component in quantitative proportions such that the atomic ratios of the components fulfill the following equations:

$$0.50 < Si/Ba \leq 0.70 \text{ and}$$

$$0.0005 \leq Ce/Ba \leq 0.03$$

A second aspect of the present invention is a method for producing a blue phosphor, comprising firing a mixture in an atmosphere of hydrogen sulfide, carbon disulfide or an inert gas, the mixture containing a barium compound component, a silicon compound component, a cerium compound component, and a sulfur compound component in quantitative proportions such that the atomic ratios of the components fulfill the following equations:

$$0.50 < Si/Ba \leq 0.70 \text{ and}$$

$$0.0005 \leq Ce/Ba \leq 0.03$$

Any of the methods (hereinafter referred to simply as the method) for producing a blue phosphor according to the present invention provides a blue phosphor which has high color purity, high luminance, high chemical stability, and a low crystallization temperature, and which is suitable for use in displays such as FED (field emission displays), PDP (plasma displays), and an EL (electroluminescence) displays, or for use in the excitation of near-ultraviolet LED (light emitting diodes).

BRIEF DESCRIPTION OF THE DRAWINGS

For a more complete understanding of the present invention and the advantages thereof, reference is now made to the following descriptions in conjunction with the accompanying drawings.

DETAILED DESCRIPTION OF THE INVENTION

Figure 1:
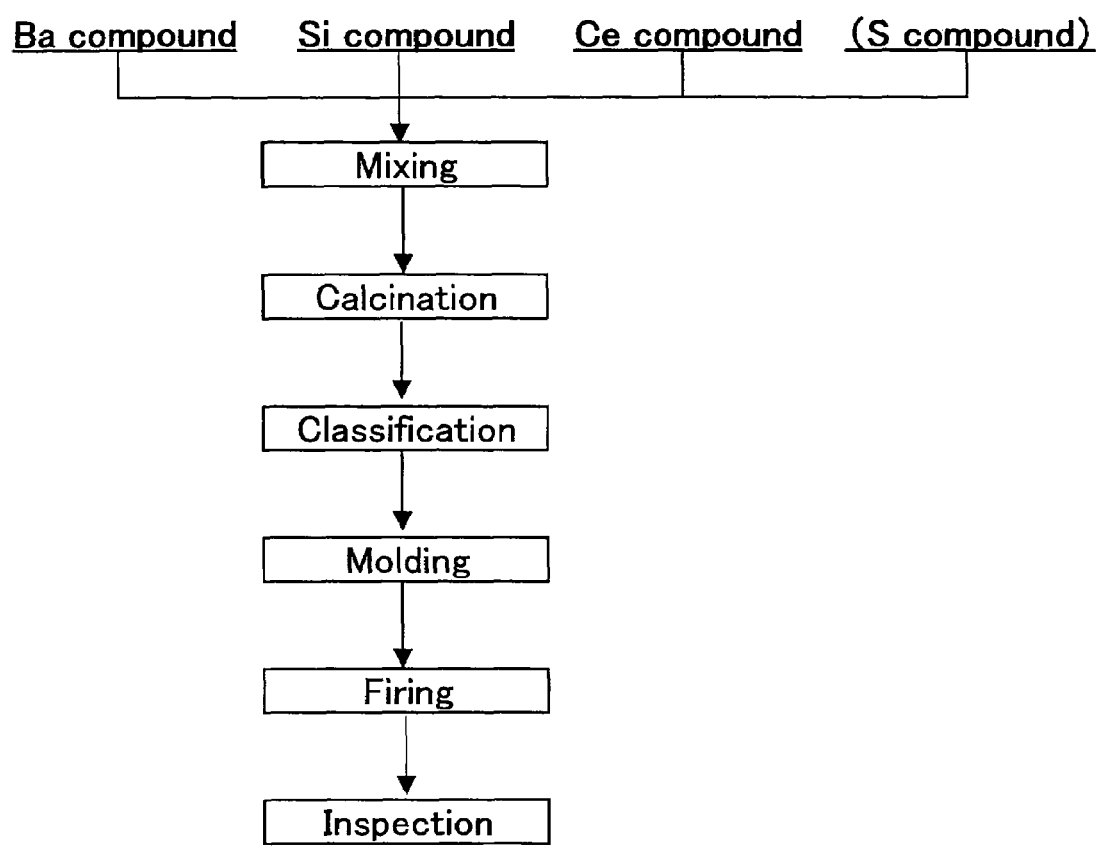
FIG. 1 is a manufacturing process chart of a pellet-shaped blue phosphor.

The method for producing a blue phosphor according to the present invention can use any compounds and elements which can be used as a barium compound component, a silicon compound component, a cerium compound component, and a sulfur compound component in the production of $Ba_2SiS_4$:Ce. For example, BaS, $BaCO_3$ and the like can be used as the barium compound component, Si, $SiS_2$ and the like as the silicon compound component, $Ce_2S_3$, $Ce_2(CO_3)_3$ and the like as the cerium compound component, and S, BaS, $SiS_2$, $Ce_2S_3$ and the like as the sulfur compound component. If hydrogen sulfide or carbon disulfide is used in a firing or calcination atmosphere, any of these compounds also serves as the sulfur compound component. If BaS is used as the starting component, for example, this means that the barium compound component and the sulfur compound component are used. If $SiS_2$ is used, it follows that the silicon compound component and the sulfur compound component are used.

In the method for producing a blue phosphor according to the present invention, there is used a mixture containing the barium compound component, the silicon compound component, and the cerium compound component in quantitative proportions such that the atomic ratios of the components fulfill the equations $0.50<Si/Ba\leqq0.70$, preferably $0.51\leqq Si/Ba\leqq0.66$, more preferably $0.53\leqq Si/Ba\leqq0.62$, and $0.0005\leqq Ce/Ba\leqq0.03$, preferably $0.0015\leqq Ce/Ba\leqq0.025$, more preferably $0.003\leqq Ce/Ba\leqq0.025$.

As described above, a blue phosphor with markedly high luminance is obtained by using the compound containing the components in quantitative proportions such that their atomic ratios fulfill the equation $0.50<Si/Ba\leqq0.70$, namely, by using Si in excess of the stoichiometric ratio, in the method for producing a blue phosphor according to the present invention. The reason for this has not been elucidated yet. In the X-ray diffraction of the resulting product, a peak for $Ba_2SiS_4$:Ce is observed, but other peaks do not appear clearly. Hence, it is speculated that a blue phosphor with much higher luminance than that of the conventional $Ba_2SiS_4$:Ce is obtained by one of the following mechanisms: (1) The use of excess Si results in the promotion of formation of Ba defects, leading to efficient diffusion of Ce in $Ba_2SiS_4$. (2) Lack of Si tends to form heterogeneous phases such as BaS, $Ba_3SiS_5$ and the like. The formation of such heterogeneous phases deteriorates the characteristics of the desired product. In the method for producing a blue phosphor according to the present invention, however, Si is used in excess of the stoichiometric ratio. Thus, the formation of the heterogeneous phases is suppressed, and $Ba_2SiS_4$:Ce of high purity is formed. (3) An undetected effective trace component is formed. In the method for producing a blue phosphor, an improvement in luminance is not very great as compared with the conventional $Ba_2SiS_4$:Ce, if the range $0.50<Si/Ba\leqq0.70$ is not complied with.

In the method for producing a blue phosphor according to the present invention, it is not novel to use the mixture containing the barium compound component, the silicon compound component, and the cerium compound component in quantitative proportions such that their atomic ratios fulfill the equation $0.0005\leqq Ce/Ba\leqq0.03$. However, satisfactory results are obtained by using the components in the range of $0.0005\leqq Ce/Ba\leqq0.03$ in combination with the condition fulfilling the equation $0.50<Si/Ba\leqq0.70$, as atomic ratios.

A mixture comprising the barium compound component, the silicon compound component, and the cerium compound component, or a mixture comprising the barium compound component, the silicon compound component, the cerium compound component, and the sulfur compound component can be used as the starting mixture for use in the method for producing a blue phosphor according to the present invention. Alternatively, it is possible to use a mixture obtained by calcining a mixture, which contains two of the barium compound component, the silicon compound component, and the cerium compound component, for 2 to 24 hours at a temperature of 800° C. or higher in an atmosphere of hydrogen sulfide, carbon disulfide, an inert gas, or a reducing gas, classifying the resulting particles, and then mixing the remaining component with the classified particles. If the sulfur compound component is to be mixed in this two-stage mixing operation, the sulfur compound component may be mixed with the initial mixture containing the two components, or may be mixed with the one component incorporated at the later stage, or may be mixed in each of the first and second stages.

In the method for producing a blue phosphor according to the present invention, if the starting mixture does not contain the sulfur compound component, this mixture needs to be fired in an atmosphere of hydrogen sulfide or carbon disulfide. Even if the starting mixture contains the sulfur compound component, however, this mixture can be fired in an atmosphere of hydrogen sulfide, carbon disulfide, or an inert gas. The hydrogen sulfide and carbon disulfide in this case each may become the sulfur compound component, and also function to suppress the decomposition of the resulting product.

In the method for producing a blue phosphor according to the present invention, the starting mixture is fired, preferably, at a temperature of 800° C. or higher. If the firing temperature is lower than 800° C., there is a tendency that firing requires a long time to be complete, or firing is insufficient. The upper limit of the firing temperature is determined by the temperature which the baking furnace withstands, the temperature at which the product is decomposed, and so on. Particularly preferably, firing is carried out at 1,000 to 1,200° C. in the method for producing a blue phosphor according to the present invention. The firing time is related to the firing temperature, and is of the order of 2 to 24 hours. The blue phosphor is obtained by such firing.

In the method for producing a blue phosphor according to the present invention, calcination can be performed for 2 to 24 hours at a temperature of 800° C. or higher in an atmosphere of hydrogen sulfide, carbon disulfide, an inert gas or a reducing gas, prior to firing. This calcination is performed as an additional step, although it is not an essential step. This calcination may be performed in a reducing gas atmosphere, unlike the firing. After the calcination, classification takes place, if desired, and finally, firing is performed to obtain the blue phosphor.

Figure 2:
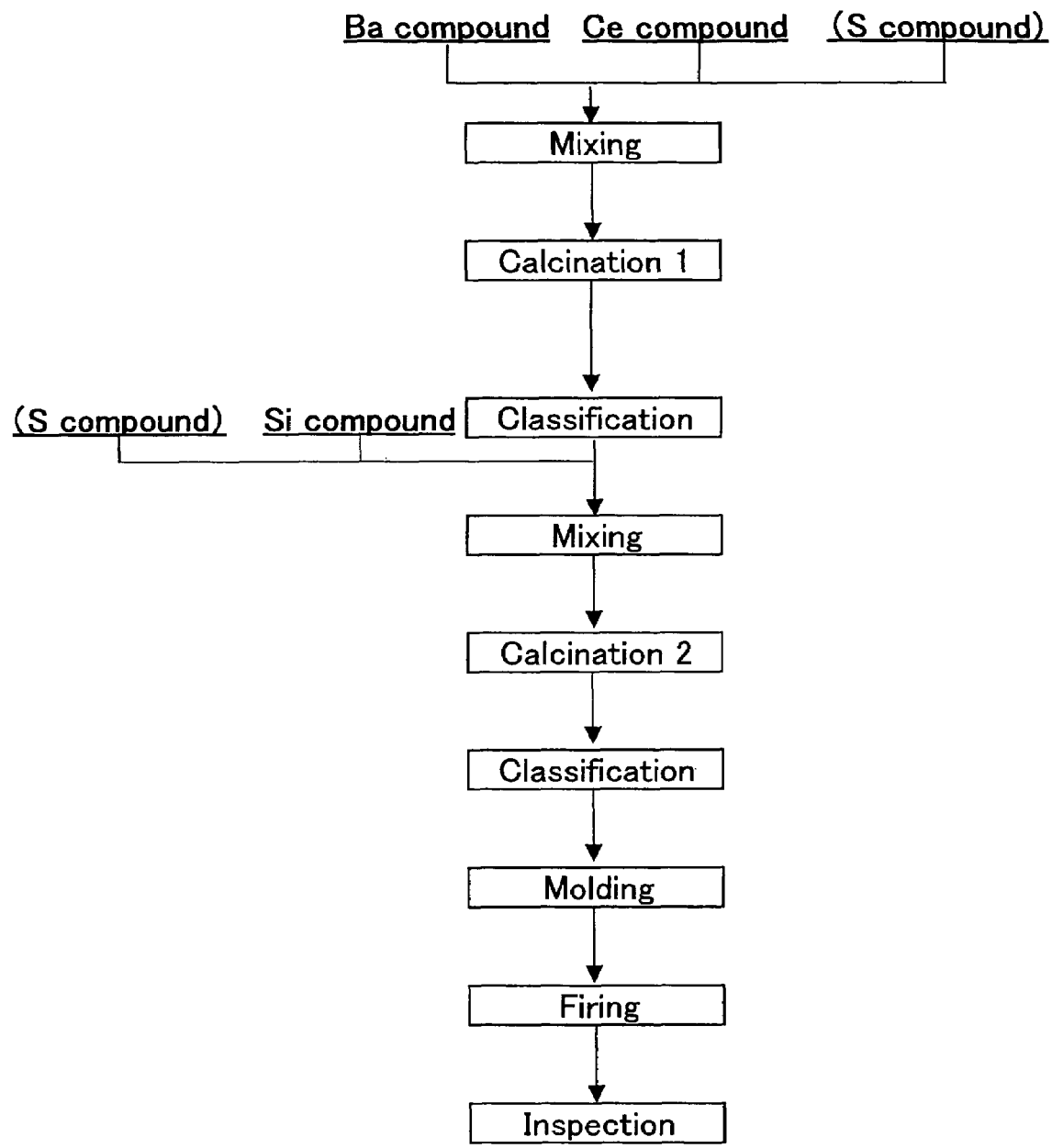
FIG. 2 is another manufacturing process chart of a pellet-shaped blue phosphor.
Figure 3:
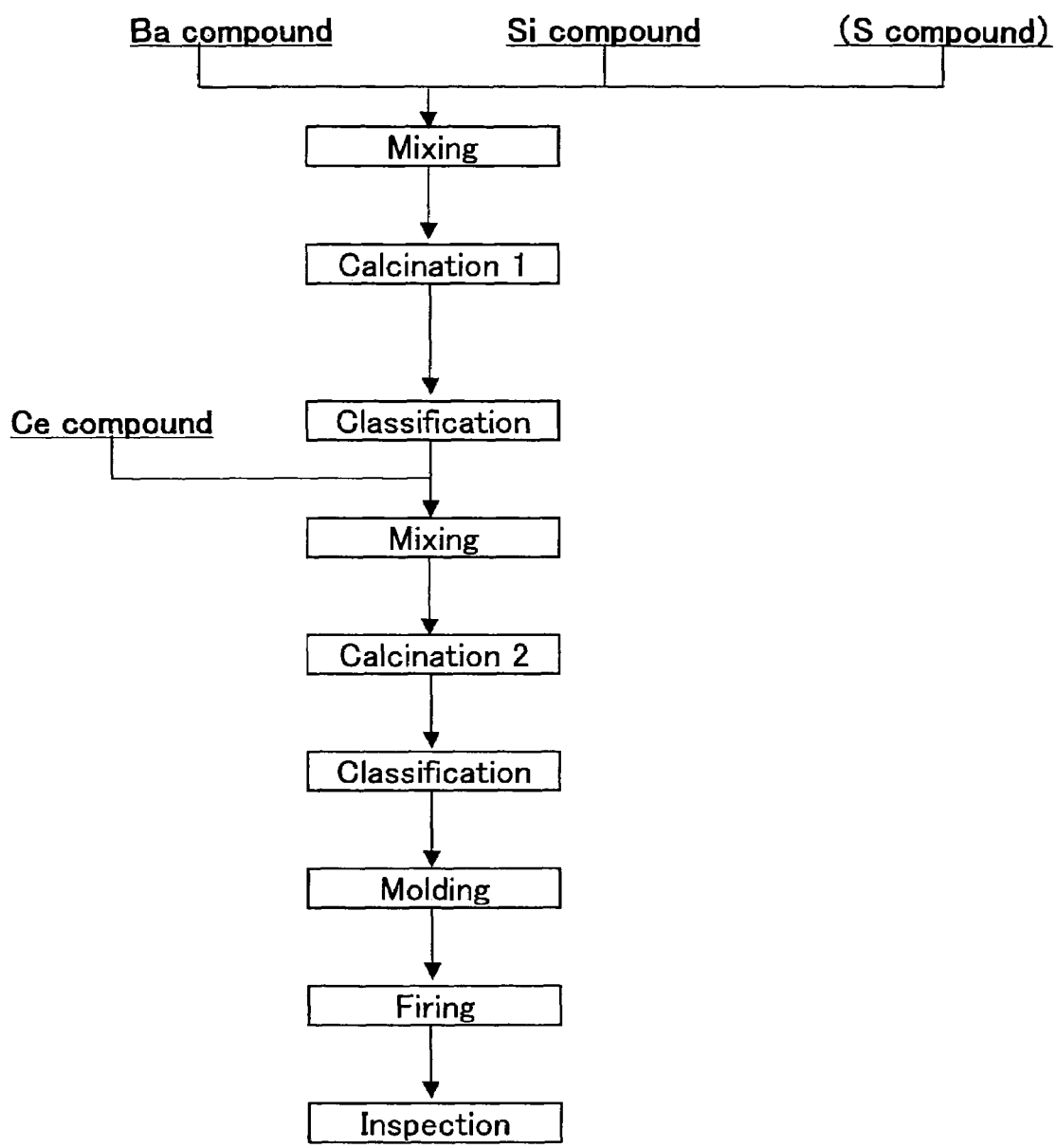
FIG. 3 is still another manufacturing process chart of a pellet-shaped blue phosphor.
Figure 4:
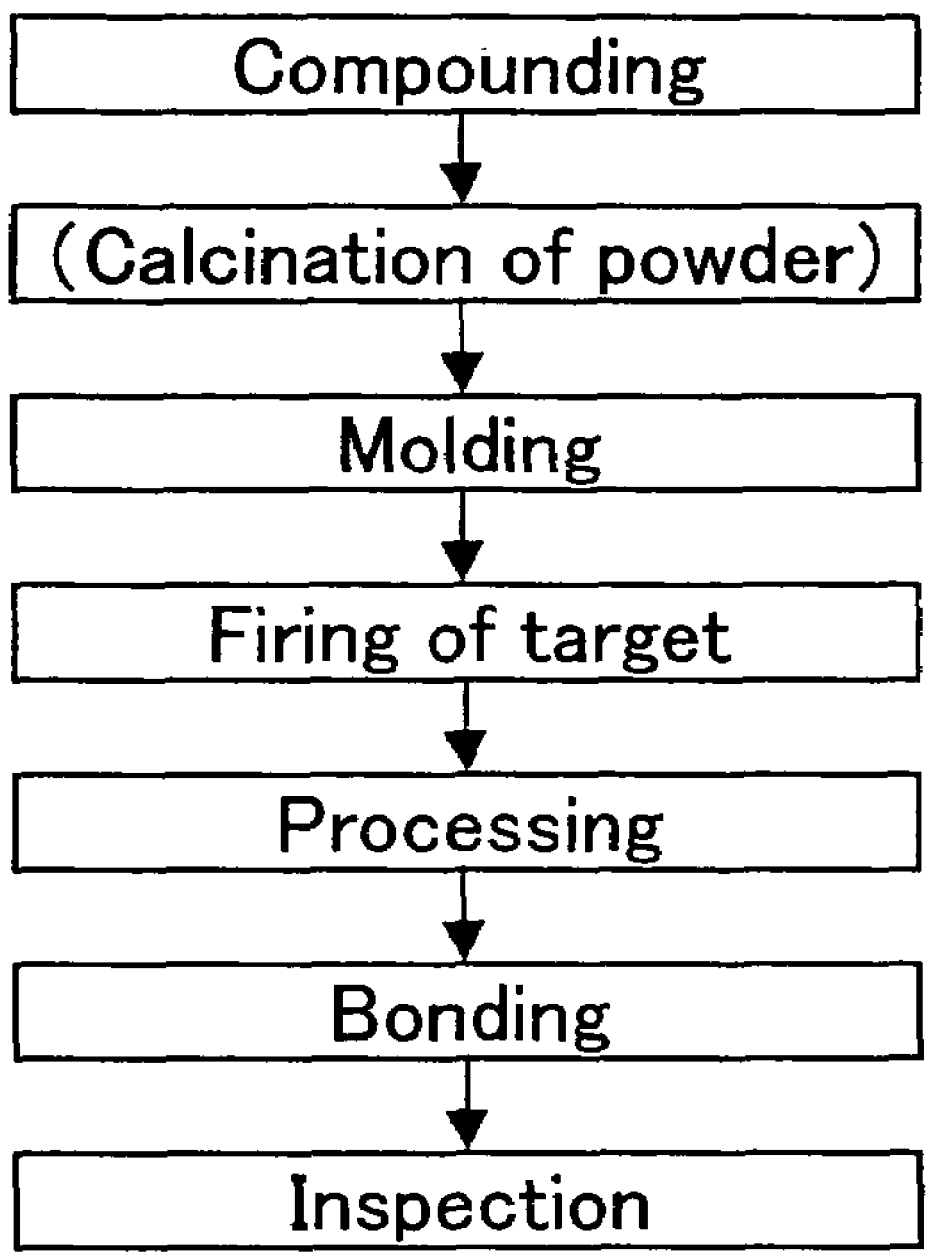
FIG. 4 is a manufacturing process chart illustrating the production, processing and bonding of a blue phosphor in the shape of a target.

In the method for producing a blue phosphor according to the present invention, the blue phosphor can be fired in the form of pellets for vapor deposition. Production examples of the pellet-shaped blue phosphor are shown in FIGS. 1 to 3 as manufacturing process charts. In FIGS. 1 to 3, the description "(S compound)" means that there are cases where the sulfur compound is added, and is not added. If neither hydrogen sulfide nor carbon disulfide is used in each of the calcination atmosphere and the firing atmosphere, the addition of the sulfur compound is essential. In the method for producing a blue phosphor according to the present invention, the phosphor can be fired in the form of a sputtering target. An example of the production, processing and bonding of the blue phosphor in the shape of the target is shown in FIG. 4 as a manufacturing process chart.

In FIGS. 1 to 4, there are no limitations on the conditions for compounding, if a uniform mixture can be formed. For example, the components can be mixed for 100 minutes by a paint shaker. The conditions for calcination and firing are as described above. No limitations are imposed on classification, if subsequent mixing and molding are easy. For example, classification is performed to achieve 150 mesh or less. To obtain a blue phosphor in the shape of pellets for vapor deposition, molding can be performed at a pressure of the order of 200 kgf/cm².

The present invention will now be described concretely by the following Examples, but is in no way limited to these Examples.

EXAMPLE 1

BaS, Si and $Ce_2S_3$ were used as starting materials. These materials were compounded in quantitative proportions such that the atomic ratio Si/Ba would take each of values as shown in Table 1 and the atomic ratio Ce/Ba would be 0.003, followed by mixing them for 100 minutes by means of a paint shaker. Then, the mixture was calcined for 4 hours at 1,150° C. in an atmosphere of hydrogen sulfide. The calcination product was molded, and fired for 4 hours at 1,150° C. in an atmosphere of hydrogen sulfide. The resulting blue phosphor was measured for photoluminescence (PL) intensity (a.u.). The results were as shown in Table 1.

TABLE 1

| | Si/Ba | | | | | | | | | |
|---|---|---|---|---|---|---|---|---|---|---|
| | 0.41 | 0.44 | 0.47 | 0.50 | 0.53 | 0.56 | 0.59 | 0.62 | 0.67 | 0.75 |
| PL intensity (a.u.) | 51 | 52 | 128 | 290 | 815 | 1776 | 1904 | 800 | 462 | 214 |

When Si/Ba = 0.75, the mixture fused at the calcination temperature, and did not form a powder.

A graph (not shown) drawn from a plot of the data shown in Table 1 shows the following findings: The atomic ratio fulfilling the equation $0.50 < Si/Ba \leq 0.70$ can result in a higher PL intensity than that of a phosphor obtained by using the atomic ratio $Si/Ba \leq 0.5$ including $Si/Ba = 0.5$ which is the atomic ratio of the prior art. The range that gives the PL intensity of about 500 a.u. or higher is the range of the atomic ratio fulfilling the equation $0.51 \leq Si/Ba \leq 0.66$. The range that gives the PL intensity of about 800 a.u. or higher is the range of the atomic ratio fulfilling the equation $0.53 \leq Si/Ba \leq 0.62$. The range that gives the PL intensity of about 1,000 a.u. or higher is the range of the atomic ratio fulfilling the equation $0.54 \leq Si/Ba \leq 0.61$.

EXAMPLE 2

BaS, Si and $Ce_2S_3$ were used as starting materials. These materials were compounded in quantitative proportions such that the atomic ratio Si/Ba would be 0.56, and the atomic ratio Ce/Ba would take each of values as shown in Table 2, followed by mixing them for 100 minutes by means of a paint shaker. Then, the mixture was calcined for 4 hours at 1,150° C. in an atmosphere of hydrogen sulfide. The calcination product was molded, and fired for 4 hours at 1,150° C. in an atmosphere of hydrogen sulfide. The resulting blue phosphor was measured for photoluminescence (PL) intensity (a.u.). The results were as shown in Table 2.

TABLE 2

| | Ce/Ba | | | | |
|---|---|---|---|---|---|
| | 0.0005 | 0.0015 | 0.005 | 0.015 | 0.025 |
| PL intensity (a.u.) | 409 | 815 | 1514 | 1409 | 987 |

A graph (not shown) drawn from a plot of the data shown in Table 2 shows that the results are preferred with $0.0005 \leq Ce/Ba \leq 0.03$, more preferred with $0.0015 \leq Ce/Ba \leq 0.025$, and the most preferred with $0.003 \leq Ce/Ba \leq 0.025$.

Although the examples of the present invention have been described above, the present invention is not limited to them, but may be varied in many other ways. It should be understood that such changes, substitutions and alterations can be made therein without departing from the spirit and scope of the invention as defined by the appended claims.

What is claimed is:

1. A method for producing a blue phosphor having the formula $Ba_2SiS_4:Ce$, comprising firing a mixture in an atmosphere of hydrogen sulfide or carbon disulfide, the mixture containing a barium compound component, a silicon compound component, and a cerium compound component in quantitative proportions such that atomic ratios of the components fulfill the following equations:

$0.50 < Si/Ba \leq 0.70$ and $0.0005 \leq Ce/Ba \leq 0.03$.

2. A method for producing a blue phosphor having the formula $Ba_2SiS_4:Ce$, comprising firing a mixture in an atmosphere of hydrogen sulfide, carbon disulfide or an inert gas, the mixture containing a barium compound component, a silicon compound component, a cerium compound component, and a sulfur compound component in quantitative proportions such that atomic ratios of the components fulfill the following equations:

$0.50 < Si/Ba \leq 0.70$ and $0.0005 \leq Ce/Ba \leq 0.03$.

3. The method for producing a blue phosphor according to claim 1, wherein the mixture is obtained by calcining a mixture, which contains two of the barium compound component, the silicon compound component, and the cerium compound component, in an atmosphere of hydrogen sulfide, carbon disulfide, an inert gas, or a reducing gas, classifying resultant particles, and then mixing one remaining component with the classified particles.

4. The method for producing a blue phosphor according to claim 2, wherein the mixture is obtained by calcining a mixture, which contains the sulfur compound component and two of the barium compound component, the silicon compound component, and the cerium compound component, in an atmosphere of hydrogen sulfide, carbon disulfide, an inert gas, or a reducing gas, classifying resultant particles, and then mixing one remaining component with the classified particles.

5. The method for producing a blue phosphor according to claim 1, further comprising an additional step of calcining the mixture in an atmosphere of hydrogen sulfide, carbon disulfide, an inert gas, or a reducing gas, prior to firing.

6. The method for producing a blue phosphor according to claim 2, further comprising an additional step of calcining the mixture in an atmosphere of hydrogen sulfide, carbon disulfide, an inert gas, or a reducing gas, prior to firing.

7. The method for producing a blue phosphor according to claim 4, further comprising an additional step of calcining the mixture obtained by calcining, in an atmosphere of hydrogen sulfide, carbon disulfide, an inert gas, or a reducing gas, prior to the firing.

8. The method for producing a blue phosphor according to claim 1, which comprises performing the firing for 2 to 24 hours at a temperature of 800° C. or higher.

9. The method for producing a blue phosphor according to claim 2, which comprises performing the firing for 2 to 24 hours at a temperature of 800° C. or higher.

10. The method for producing a blue phosphor according to claim 7, which comprises performing each of the firing and calcining for 2 to 24 hours at a temperature of 800° C. or higher.

11. The method for producing a blue phosphor according to claim 1, which comprises firing the mixture in a shape of pellets.

12. The method for producing a blue phosphor according to claim 2, which comprises firing the mixture in a shape of pellets.

13. The method for producing a blue phosphor according to claim 10, which comprises firing the mixture in a shape of pellets.

14. The method for producing a blue phosphor according to claim 1, which comprises firing the mixture in a shape of a target.

15. The method for producing a blue phosphor according to claim 2, which comprises firing the mixture in a shape of a target.

16. The method for producing a blue phosphor according to claim 10, which comprises firing the mixture in a shape of a target.

17. The method for producing a blue phosphor according to claim 1, which comprises performing the firing at 1,000 to 1,200° C.

18. The method for producing a blue phosphor according to claim 2, which comprises performing the firing at 1,000 to 1,200° C.

19. The method for producing a blue phosphor according to claim 10, which comprises performing each of the firing and calcination at 1,000 to 1,200° C.

20. The method for producing a blue phosphor according to claim 16, which comprises performing each of the firing and calcination at 1,000 to 1,200° C.

21. The method for producing a blue phosphor according to claim 2, wherein the mixture is obtained by calcining a mixture, which contains two of the barium compound component, the silicon compound component, and the cerium compound component, in an atmosphere of hydrogen sulfide, carbon disulfide, an inert gas, or a reducing gas, classifying resultant particles, and then mixing one remaining component and the sulfur compound component with the classified particles.

* * * * *